United States Patent
Coan et al.

[11] Patent Number: 6,136,073
[45] Date of Patent: Oct. 24, 2000

[54] BORESIDE FEED MODULES WITH PERMEATE FLOW CHANNELS

[75] Inventors: Frederick Coan; Thomas O. Jeanes, both of Antioch; John Arthur Jensvold, Benicia, all of Calif.

[73] Assignee: MG Generon, Malvern, Pa.

[21] Appl. No.: 09/184,604

[22] Filed: Nov. 2, 1998

[51] Int. Cl.[7] ............................................. B01D 53/22
[52] U.S. Cl. .......................... 96/8; 96/10; 210/321.8; 210/321.89; 210/500.23
[58] Field of Search ................... 96/8, 10; 210/321.79, 210/321.8, 321.81, 321.88, 321.89, 321.9, 500.23

[56] References Cited

U.S. PATENT DOCUMENTS

| | | | |
|---|---|---|---|
| 4,666,469 | 5/1987 | Krueger et al. | 96/8 X |
| 4,929,259 | 5/1990 | Caskey et al. | 210/321.81 X |
| 4,961,760 | 10/1990 | Caskey et al. | 210/321.81 X |
| 5,000,763 | 3/1991 | Sanders, Jr. et al. | 55/16 |
| 5,013,331 | 5/1991 | Edwards et al. | 55/16 |
| 5,013,437 | 5/1991 | Trimmer et al. | 210/321.78 X |
| 5,071,552 | 12/1991 | Bikson et al. | 210/321.8 |
| 5,160,042 | 11/1992 | Bikson et al. | 210/321.8 |
| 5,282,964 | 2/1994 | Young et al. | 210/321.8 |
| 5,284,583 | 2/1994 | Rogut | 210/321.8 |
| 5,500,036 | 3/1996 | Kalthod | 96/8 X |
| 5,525,143 | 6/1996 | Morgan et al. | 96/8 X |
| 5,702,601 | 12/1997 | Bikson et al. | 210/321.79 |
| 5,779,897 | 7/1998 | Kalthod et al. | 210/321.8 |

*Primary Examiner*—Robert H. Spitzer
*Attorney, Agent, or Firm*—Robbins & Associates

[57] ABSTRACT

A boreside feed gas separation membrane device containing primarily hollow fiber membranes with discrete flow channels incorporated into the bundle to allow for pressure removal of the permeate gas collected on the shellside of the device is described. The flow channels minimize pressure drop and/or the build-up of back pressure on the shellside of the device while maintaining proper counter-current flow patterns in the device. The incorporation of flow channels results in improved efficiency of the device, especially for feed streams or membrane types that lead to high permeate flow rate that result in excessive shellside pressure drops.

21 Claims, 3 Drawing Sheets

BORESIDE FEED MODULES WITH PERMEATE FLOW CHANNELS

TECHNICAL FIELD

The invention relates generally to fluid membrane separation using fiber membrane technology. In particular, the present invention relates to a boreside feed gas separation membrane module comprising membranes with discrete flow channels to allow for permeation based on separation of gases.

BACKGROUND OF THE INVENTION

A variety of devices for separating fluid mixtures with hollow fiber membranes have been described. See for example, U.S. Pat. Nos.: 4,961,760; 4,929,259; 5,000,763; 5,013,331; 5,013,437; 5,071,552; 5,160,042; 5,282,964; 5,702,601; 5,284,583 and 5,779,897.

Typically, the separation process is carried out in a module fabricated from semi-permeable membranes. Such membrane separations are based on relative permeabilities of various components of the fluid mixture, resulting from a gradient of driving forces, such as pressure, partial pressure, concentration and temperature. Such selective permeation results in the separation of the fluid mixture into retentate, i.e. slowly permeable components, and permeate portions, i.e. faster migrating components.

In boreside feed processes the feed fluid is introduced into the open bores of the hollow fibers and one or more components permeate through the walls of the hollow fibers into the region outside the fibers. The fluid which selectively permeates through the fiber membrane wall is removed from the shellside of the membrane, while the non-permeable fluid is removed from the non-permeate region.

Obtaining proper flow and distribution of the permeate fluid on the shellside of the fibers is a problem associated with boreside feed. During separation, the high permeate flow rate may result in excessive shellside pressure drops. Additionally, the uncontrolled flow of the permeate fluid on the shellside of the membrane may cause localized areas of high concentration or partial pressure of the permeate fluid, thus resulting in inefficient or ineffective separation of the fluid mixture.

The efficiency of the fluid separation process is determined by the properties of fluid mixture, the membrane material and its structure. The productivity of the membrane device is proportional to the surface area of the membrane material packed in the device, while the separation efficiency of the device inversely depends on the thickness of the membrane material. Generally this is achieved by providing the membrane as hollow fibers of substantial length and small diameter, arranged parallel to one another. However, decreasing the diameter of the long fibers can result in increased back pressure. The efficiency of separation drops further with the use of thinner capillaries or with highly permeable capillaries with asymmetric wall structures. Other methods to decrease the shellside pressure drop, such as larger fiber size, shorter device length and decreased fiber packing density result in increased cost and/or decreased module productivity.

Therefore, current membrane devices containing long hollow fibers with small diameters are costly and inefficient when the pressure drop is large and thus not commercially viable for meeting current uses. Thus, there is a need for improved and cost-effective devices comprising fiber membranes that are capable of operating at acceptable levels of separation productivity.

SUMMARY OF THE INVENTION

The present invention defines a boreside feed gas separation membrane device containing primarily hollow fiber membranes with discrete flow channels incorporated into the bundle to allow for pressure removal of the permeate gas collected on the shellside of the device. The flow channels minimize pressure drop and/or the build-up of back pressure on the shellside of the device while maintaining proper counter-current flow patterns in the device. The incorporation of flow channels results in improved efficiency of the device, especially for feed streams or membrane types that lead to high permeate flow rate that result in excessive shellside pressure drops.

In one aspect, the invention relates to a hollow fiber membrane fluid separation device adapted for boreside feed, wherein the device comprises:

(a) a plurality of elongate hollow fiber membranes adapted for separation of one or more fluids from a fluid mixture, wherein the membranes are arranged in a bundle having a first end and a second end;

(b) a first tubesheet having an inner face and an outer face and arranged at the first end of the bundle, wherein the hollow fiber membranes extend through the first tubesheet and are open at the outer face thereof;

(c) a second tubesheet having an inner face and an outer face and arranged at the second end of the bundle, wherein the hollow fiber membranes extend through the second tubesheet and are open at the outer face thereof;

(d) a core about which the bundle of hollow fiber membranes is arranged, wherein the core extends through and is attached to said first and second tube sheets;

(e) a plurality of elongate permeate flow channels arranged in spaced-apart relation to each other within the bundle and extending from the first end to the second end of the bundle, wherein the flow channels are embedded in the first and second tubesheets, and further wherein the flow channels are sealed at the outer faces of the first and second tubesheets;

(f) an elongate shell having first and second open ends, wherein the bundle, the first and second tubesheets, and the core are encased within the shell and the first tubesheet is arranged at the first end of the shell and the second tubesheet is arranged at the second end of the shell;

(g) a first sealing endcap which is attached, i.e. optionally sealed or removably attached, to the first open end of the shell, wherein a feed inlet region is established between the endcap and the outer face of the first tubesheet;

(h) a feed inlet for introducing into the feed inlet region a fluid mixture to be separated into the bores of the hollow fiber membranes;

(i) a second sealing endcap which is attached, i.e. optionally sealed or removably attached, to the second open end of the shell, wherein a non-permeate outlet region is established between the second endcap and the outer face of the second tubesheet;

(j) an outlet for removing from the non-permeate outlet region fluid from the mixture which does not permeate from the hollow fiber membranes;

(k) first and second sealing means which respectively seal the first and second tubesheets against the shell, thereby defining a permeate outlet region between the shell and the outside of the bundle; and (l) a permeate outlet means for removing fluid which permeates from the hollow fiber membranes into the permeate outlet region.

In a preferred embodiment, the permeate flow channels are arranged uniformly within the bundle such that counter-current flow performance can be maintained during fluid separations. In a more preferred embodiment, the permeate flow channels are arranged at the interfaces between adjacent concentric membrane layers. In a most preferred embodiment, the permeate flow channels are arranged in the bundle as a series of concentric rings which encircle the core.

In an alternative embodiment, the device as described above, comprises a coreless design, wherein the bundle of hollow fiber membranes is arranged around an axially oriented hollow channel. In another preferred embodiment, a plurality of hollow fiber membrane bundles comprising permeate flow channels as described above, are assembled in a single shell as described in U.S. Pat. No. 5,282,964.

In another embodiment, the device further comprises a sweep inlet means for introducing a sweep fluid into the permeate outlet region.

In a preferred embodiment, the fluid mixture comprises a mixture of gases. Preferably the gas mixture comprises a gas selected from the group consisting of hydrogen, oxygen, helium, nitrogen, carbon monoxide, and carbon dioxide.

The invention device yields high-purity non-permeate product stream, while improving productivity and recovery of the process. Additionally, the invention is cost-effective, easy to manufacture and can be easily adapted for a wide range of productivity requirements.

These and other embodiments of the present invention will readily occur to those of ordinary skill in the art in view of the disclosure herein.

DETAILED DESCRIPTION

Figure 1:
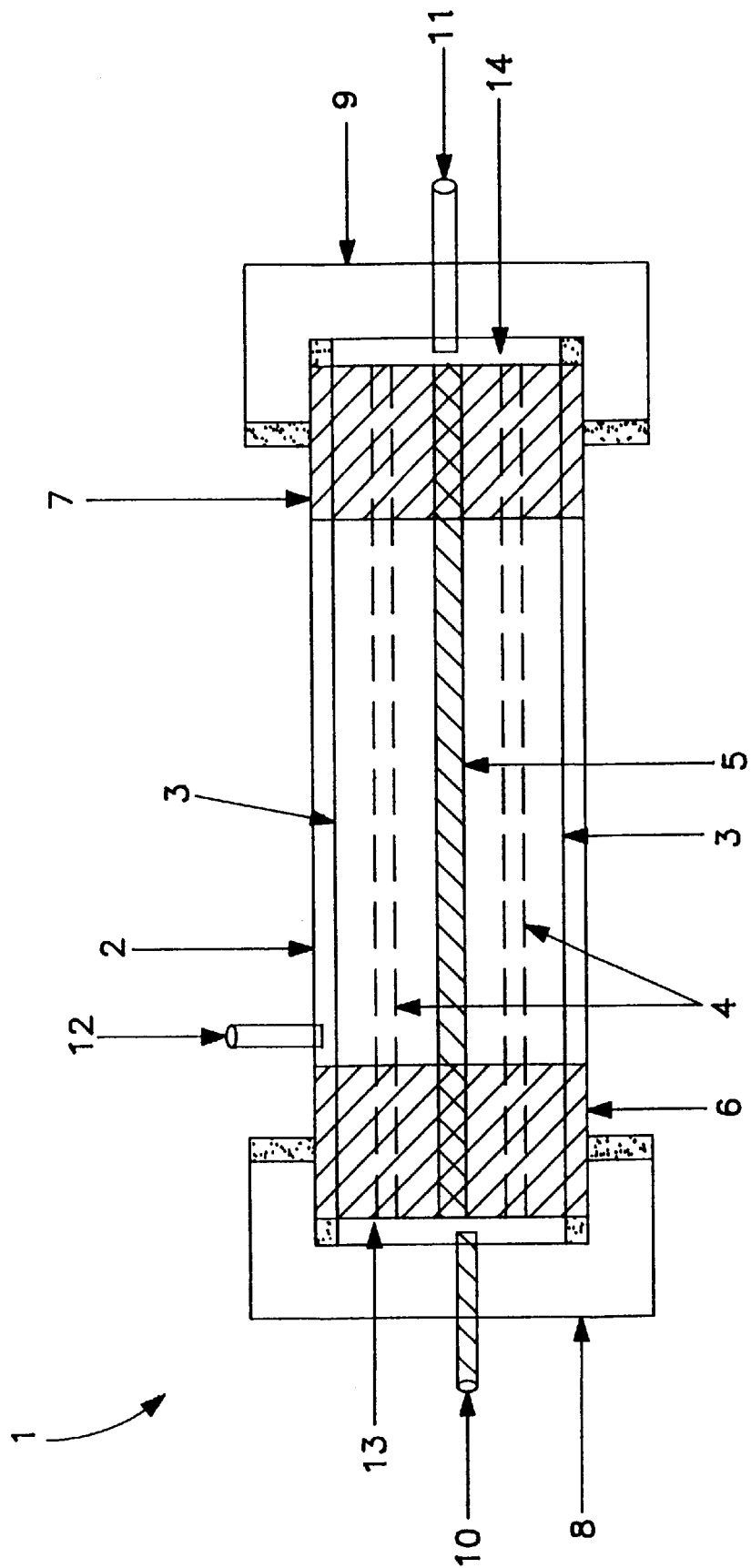
FIG. 1 illustrates a sectional view of the membrane separation device according to one embodiment of the invention.

The practice of the present invention will employ, unless otherwise indicated, conventional techniques of chemistry and engineering which are within the skill of the art. Such techniques are explained fully in the literature. Kesting, R. E., *Synthetic Polymeric Membranes*, John Wiley & Sons, $2^{nd}$ Ed. (1985); Hwang, Sun-Tak and Kammermeyer, Karl, *Membranes in Separation*, Robert E. Kriegar Publishing Co., Inc., (1984).

All patents, patent applications, and publications mentioned herein, whether supra or infra, are hereby incorporated by reference in their entirety.

It must be noted that, as used in this specification and the appended claims, the singular forms "a", "an", and "the" include plural referents unless the content clearly dictates otherwise. Thus, for example, reference to "a hollow fiber membrane" includes two or more such membranes and the like.

Membranes of the invention may be homogenous, composite, or asymmetric membranes, as described in U.S. Pat. No 4,874,401. Preferably the membranes of the invention are asymmetric or composite. In addition, the membranes may be shaped in the form of flat sheets, hollow fibers, or hollow tubes.

Although a number of compositions and methods similar or equivalent to those described herein can be used in the practice of the present invention, the preferred materials and methods are described. Therefore, it is to be understood that the terminology and examples used herein are for the purpose of describing particular embodiments of the invention only, and are not intended to be limiting.

The present invention provides a device comprising membrane modules for separating one or more fluids in a fluid mixture into permeate and retentate portions. The fluid mixture may be a mixture of fluids in a gas, vapor, or liquid state. The membrane module comprises an elongated hollow casing and a plurality of flexible hollow fibers of semi-permeable membrane material. The casing encloses a flow pathway and has a pair of opposite ends. The flexible hollow membrane fibers are capable of separating a fluid mixture into permeate and retentate portions. Each hollow fiber has a pair of spaced opposite end portions and an elongated portion extended between and interconnecting opposite end portions.

The hollow fibers can be arranged in various forms such as individual hollow fibers, bundles of hollow fibers, knitted or wefted textiles, and membrane carpets or rugs, including those disclosed in Mahon, U.S. Pat. No. 3,228,876 and McLain, U.S. Pat. No. 3,422,008. Preferably the bundle is arranged in a substantially non-random organized manner. In a preferred embodiment, the bundle is elongated and arranged in a cylindrical fashion with the ends of the hollow fibers located at each end of the cylindrical bundle. Preferably, the hollow fibers in the bundle are arranged in either a parallel wrap fashion, wherein the hollow fibers lie substantially parallel to one another with each end of the hollow fibers found at each end of the bundle. In an alternative embodiment, the hollow fibers in the bundle are wrapped in a bias wrap fashion, wherein the hollow fibers are wrapped in a crisscross pattern at a set angle, thus holding the hollow fibers in place in a bundle. In a preferred embodiment, the number of fibers in a bundle range from 0.1 to 5 million, preferably from 1–2 million and most preferably from 1 to 1.5 million; wherein the outer diameter of the fiber ranges from 100 to 500 microns, preferably from 100 to 300 microns, and most preferably from 100 to 200 microns; the outer diameter of the bundle arranged as concentric circles ranges from 1 to 15 inches, preferably from 7 to 12 inches, and most preferably from 8 to 10 inches; and the packing density of the fibers within the bundle ranges from 30 to 70%, preferably from 40 to 65% and most preferably from 50 to 60%. The packing density is defined as the fraction of the cross-sectional area of the module occupied by the hollow fibers, wherein the cross-sectional area is based on its internal diameter and the cross-sectional area of the hollow fibers is based on their outer diameter.

The hollow fiber membranes are generally formed from a semi-permeable polymeric material, preferably olefinic polymers, such as poly-4-methylpentene, polyethylene, and polypropylene; polytetrafluoroethylene; cellulosic esters, cellulose ethers, and regenerated cellulose; polyamides; polyetherketones and polyetheretherketones; polyestercarbonates; polycarbonates, including ring substituted versions of bisphenol based polycarbonates; polystyrenes; polysulfones; polyimides; polyethersulfone; and the like. The hollow fiber membranes may be homogeneous, symmetric, asymmetric, or composite membranes. The membranes may have a dense discriminating region wherein the separation of the fluid mixture is based on differences in solubility and diffusivity of the fluids; or the membranes may be microporous wherein the separation is based on relative volatilities of the fluids. Preferably the membranes are asymmetric fibers as described in U.S. Pat. No. 4,955,993. The methods for preparing such hollow fiber membranes are well known in the art. (See, for example, U.S. Pat. No. 4,961,760).

A tubesheet is arranged around each end of the bundle, such that the hollow fiber membranes extend through the tubesheet and are open at the outer surface thereof. The tubesheet provides a support, holding the hollow fiber membranes in place and separates the membrane device into three different regions: (1) the feed inlet for the introduction of fluid mixture to be separated into the hollow fiber membranes; (2) the region between the tubesheets wherein a portion of the boreside fed fluid permeates across the hollow fiber membranes onto the shellside of the hollow fiber membranes; and (3) the non-permeate outlet region from which the retentate fluid is removed. The tubesheet is comprised of a thermoset or thermoplastic resinous material capable of forming a fluid-tight seal around the hollow fiber membranes, and optionally capable of bonding to the core and/or the hollow fiber membranes. The face of each tubesheet opposite the bundle is opened such that the bores of the hollow fiber membranes are opened to the region adjacent to each face, thereby allowing communication of fluid from such regions into and out of said hollow fiber membranes. Each tubesheet generally comprises a composite of the hollow fiber membranes embedded in the resinous material. The tubesheet may exist in any shape as desired, as long as it is able to withstand the pressure during operation. In a preferred embodiment, the tubesheet is circular with sufficient cross-sectional area and thickness to provide adequate support for the hollow fiber membranes. The portion of each tubesheet outside of the bundle may be built up for various purposes depending upon the design of the device.

Examples of resinous materials for the tubesheet are described in U.S. Pat. No. 4,961,760, and include artificial and natural rubbers, phenol aldehydes, acrylic resins, polysiloxanes, polyurethanes, fluorocarbons, and epoxy resins. In a preferred embodiment the tubesheet is prepared from epoxy resins. The device may optionally contain an additional tubesheet support means to support the outer edge of the tubesheets and to prevent or reduce bending and compression stresses resulting from the application of pressure on the outside of the tubesheet. The tubesheet support means may be made of any material which provides sufficient support to prevent or reduce the compression and bending stresses on the tubesheet and to prevent the tubesheets from collapsing in on one another. Such materials include high strength plastics such as PVC, composites, and metals such as aluminum and steel.

In one embodiment, the hollow fiber membrane bundle is arranged about a core, wherein the core extends through and is bonded to both the first and second tubesheets. The core provides support for the tubesheets, preventing them from collapsing upon one another during operation. The core also supports the hollow fiber membrane bundle which is arranged about the core. The core comprises a suitable material that possesses sufficient mechanical strength to provide the desired support for the bundle and tubesheets, and can include a rod, a solid tube, a perforated tube, and the like. Such materials include, but are not limited to, plastics such as PVC, a composite material, or a metal. Preferably, the core is comprised of a metal, such as aluminum or steel.

In an alternative embodiment, the device comprises a coreless design, wherein the bundle of hollow fiber membranes is wrapped along a long shaft, and the shaft is subsequently removed such that the bundle is arranged around an axially oriented hollow channel. In another preferred embodiment, a plurality of hollow fiber membrane bundles comprising permeate flow channels as described above, are assembled in a single shell as described in U.S. Pat. No. 5,282,964.

In another embodiment, a sweep fluid is introduced into the permeate outlet region to facilitate the removal of permeated fluids from the shellside of the hollow fiber membranes. The sweep fluid may be introduced through a sweep inlet means, wherein the sweep inlet means are preferably on the core. Alternatively, the sweep fluid may be introduced through a sweep inlet means, a second port located at the opposite end of the module from the feed port, and in communication with the permeate outlet region. In a preferred embodiment, the core tube is solid when it passes through the feed inlet region and non-permeate outlet region, and is perforated in the vicinity of the hollow fiber membrane bundle. In another preferred embodiment, the core is perforated at one end of the portion of the core located between the tubesheets. In one such embodiment, the sweep inlet is located at the opposite end of the module from the fluid mixture feed inlet. In an alternative embodiment, the sweep inlet is located at the same end of the module as the fluid mixture feed inlet.

The membrane device comprises a plurality of permeate flow channels arranged in spaced-apart relation to each other within the hollow fiber membrane bundle and extending from one end to the second end of the bundle, wherein the flow channels may extend through the first and second tubesheets and are sealed and blocked at the outer faces of the first and second tubesheets. The permeate flow channels are arranged in any desirable order and may be embedded within the interior of the hollow fiber bundle. The permeate flow channels may be arranged as concentric tubes parallel to the core; in a spiral fashion beginning at the core and ending near or at the outside of the bundle; or in such a manner that the first and second ends of the flow channel extend into the permeate outlet regions. Preferably, the permeate flow channels are arranged uniformly within the bundle such that the counter-current flow performance can be maintained during fluid separations. In a preferred embodiment, the bundle comprises a series of concentric layers of hollow fiber membranes arranged about the core, and the permeate flow channels are arranged at the interfaces between adjacent concentric membrane layers, such that the permeate flow channels are arranged in the bundle as a series of concentric rings which encircle the core.

In another embodiment, the device comprises a first set of additional flow channels placed perpendicular to the fiber bundle, wherein the additional channels are in proximity of the feed channel and are radially distributed, and preferably are located within the first 0–50% of the overall bundle length, i.e. in the region adjacent to the feed inlet. In an alternative embodiment, the device further comprises a second set of additional flow channels placed perpendicular to the fiber bundle, wherein the second set of additional flow channels are located within 50–100% of the overall bundle length, i.e. in the region at opposite end of the first set of additional flow channels. In another embodiment, the additional flow channels are radially distributed and located perpendicular to the fiber bundle, such that the additional channels are within the first 0–50% of the overall bundle length and terminate in the permeate outlet region. In yet another alternative embodiment, the additional flow channels are located perpendicular to the fiber bundle and are helically distributed, such that the additional channels are within the first 0–50% of the overall bundle length and are in close proximity to the feed channels, wherein the flow channel is at least about 3 to about 115 times the diameter of the membrane fiber, preferably at least about 7 to about 80 times, and more preferably at least about 19 to about 60 times the diameter of the membrane fiber. In an additional embodiment, additional perpendicular channels are optionally located throughout the entire length of the overall bundle to further facilitate fluid sweep efficiency.

Figure 3:
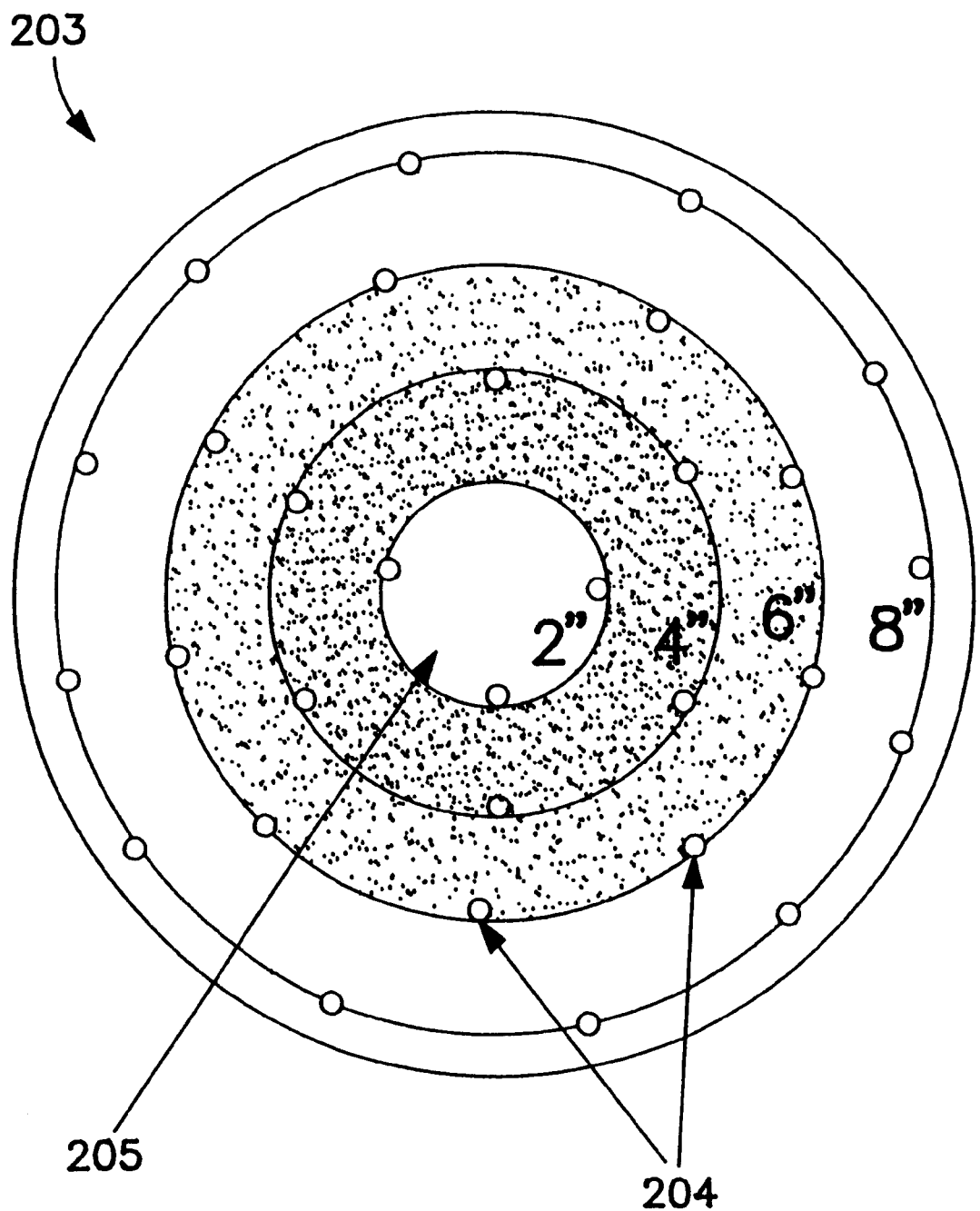
FIG. 3 illustrates a cross-sectional view of the membrane device shown in FIG. 1.

The flow channels have an outer diameter ranging from about 500 to 15000 microns; preferably 1000 to 10000 microns; and most preferably 2500 to 7500 microns. The number of flow channels present in the bundle depends on the number required to lower the back pressure sufficiently (0.3 to 5 psig), while maintaining volumetric productivity. Generally, the number of flow channels in a bundle is about one channel per 500 to 500,000 hollow fiber membranes; preferably one channel per 5,000 to 300,000 hollow fiber membranes; and most preferably one channel per 10,000 to 200,000 hollow fiber membranes. Additionally, to maintain efficient counter-current flow performance, it is desirable to place the flow channels uniformly in the hollow fiber bundle. The number of flow channels used, channel spacing and channel size thus depends upon the bundle diameter, fiber packing density, fiber permeability and the bundle length. In general, for high volumetric permeate flow, tight channel spacing and large channel size is necessary. In a preferred embodiment, the flow channels are preferably placed at intervals measured along the bundle diameter from the core of between about ¼ to about 2 inches, more preferably about ¾ to about 1-½ inches, even more preferably about ¾ to 1-¼. For example, in an embodiment wherein the membrane device contains a bundle 9" in diameter and 72" in length, as the bundle is fabricated from a belt of gas-separation membrane fiber, ¼" tubular polyethylene tubing is placed in the bundle at various intervals: at 2" diameter (3-¼"×72" tubes placed 2" apart), at 4" diameter (6-¼"×72" tubes placed 2" apart), at 6" diameter (9-¼"×72" tubes placed 2" apart), and at 8" diameter (12-¼"×72" tubes placed 2" apart), as depicted in FIG. 3.

The length of the flow channels should be sufficient to promote counter-current flow along a major portion of the length of the hollow fiber membranes. The flow channels preferably extend along the length of the bundle between the tubesheets between about 0 to 100%, more preferably between about 50 to 100%, even more preferably between about 80 to 100%. Other examples of materials useful as flow channels include materials that have mechanical strength and high void fraction such as open cellofoam, helically wound polyethylene fiber, large-bore porous hollow fibers, elastic sleeving, metallic screen rolled in tubular or triangular form, and the like.

The entire membrane device is placed within an elongated shell so as to form a seal between the tubesheets and the shell, thus preventing the fluid from communicating across or through the seal. The seal is formed by any capping means which provides a fluid tight seal between each of the tubesheets and the shell, including an adhesive material, an endcap, a gasket, and the like. The shell may comprise any material capable of protecting the membrane device from the environment, and is preferably a pressure vessel. Preferably, the casing material is a plastic such as PVC, a composite, or a metal. More preferably, the casing material is metal, such as aluminum or steel. The shell may optionally contain a material to absorb shock and/or to insulate the membrane device, wherein such material includes polyurethane foam and tightly packed foam beads.

Capping means are located at each end of the shell, and are arranged for sealing the end of the shell near the tubesheet to form regions adjacent to the opposite faces of the tubesheets which are opened to the hollow fiber membranes, i.e. (1) the feed inlet region adjacent to the outside face of the first tubesheet; and (2) the non-permeate outlet region adjacent to the outside face of the second tubesheet. Such end capping means are attached, i.e. optionally sealed or removably attached, to the shell by appropriate attachment means such as bolting, using o-rings and grooves, clam-shell retainer and other equivalent means.

The membrane device comprises a feed inlet means for introducing into the feed inlet region the fluid mixture to be separated, such as a port, nozzle, fitting, or other suitable opening. The feed inlet means may be located in the first end capping means. The feed inlet region is defined by the first tubesheet, the first end capping means, and the shell. The feed inlet region communicates with one end of the hollow fiber membranes, thus allowing the feed fluid mixture to be separated to flow into and down the bores of the hollow fiber membranes. Preferably, the feed inlet region is sealed to prevent fluid communication with the outside of the membrane device or with the region between the tubesheets which is outside the hollow fiber membranes.

The membrane device comprises a non-permeate outlet means for removing the retentate from the non-permeate outlet region. The retentate fluid exits the bores of the hollow fiber membranes at the end opposite the feed inlet end, and preferably, the exiting fluid enters a non-permeate outlet region. The non-permeate outlet means may be located in the second end capping means, and includes a port, nozzle, fitting, or other suitable opening. The non-permeate outlet region is a cavity defined by the second tubesheet, the shell, and the second end capping means. Preferably the non-permeate outlet region is sealed such that fluid cannot communicate with the outside of the membrane device or with the region between the tubesheets which is outside the hollow fiber membranes.

The membrane device comprises a permeate outlet means for removing the fluid which permeates through the hollow fiber membranes into the permeate outlet region. The permeate outlet means include a port, nozzle, fitting, or other suitable opening. In a preferred embodiment, the permeate outlet means is located at an end near the feed inlet means, resulting in counter-current flow of the feed fluid mixture as compared to the flow of the permeate fluid. This counter-current flow enhances the concentration gradient along the hollow fiber membranes, thereby improving the recovery and productivity of the membrane device. In an alternative embodiment, the permeate outlet means is located at the end opposite to the feed inlet means providing counter-current flow.

In a preferred embodiment, the membrane devices of this invention are useful in separating a mixture wherein the feed mixture comprises a gas mixture of one or more gases. The feed mixture preferably comprises at least one of the gases selected from the group consisting of hydrogen, helium, oxygen, nitrogen, carbon monoxide, carbon dioxide, methane, hydrogen sulfide, ammonia, methane, other light hydrocarbons, and the like. Light hydrocarbons as used herein refers to $C_{1-4}$ containing saturated and unsaturated hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

In the embodiment wherein the fluid mixture comprises a mixture of gases, generally, one side of the membrane is contacted with a feed gas mixture under pressure, while a pressure differential is maintained across the membrane. At least one of the components in the gas mixture selectively permeates through the membrane more rapidly than the other components. A stream is obtained on the low pressure side of the membrane which is enriched in the faster permeating component. The permeated gas is removed from the low pressure/downstream side of the membrane. A stream depleted in the faster permeating gas is withdrawn from the high pressure/upstream side of the membrane. Preferably, the separation process is carried out at pressures and temperatures which do not adversely affect the membrane. For example, for an oxygen/nitrogen mixture, the pressure differential across the membrane is preferably between 10 and 500 psig, more preferably between about 50 and 200 psig; whereas for a carbon dioxide/methane, the pressure differential across the membrane is preferably between 50 and 1000 psig, more preferably between about 50 and 500 psig. Additionally, for a continuous operation system, the operating temperature is preferably from about 0–100° C., more preferably from about 0–50° C.

In another preferred embodiment, wherein the fluid mixture to be separated comprises liquids, the material is transported through or across the membrane as a gas or vapor. The permeate may be removed from the device either as a gas or vapor or it may be condensed and removed as a liquid. This process of separation is referred to as membrane stripping, membrane distillation, or pervaporation and is preferably used to separate volatile compounds from non-volatile compounds. In membrane stripping, a microporous membrane is used and the permeate is removed from the device as a gas or vapor; in membrane distillation, the permeate is condensed and removed from the device as a liquid; whereas in pervaporation, a non-microporous membrane is used and the permeate may be removed as a gas or vapor as a liquid after condensation. Examples of volatile compounds which may be removed from liquid mixtures include $C_{1-10}$ aliphatic and aromatic halogenated hydrocarbons such as dichloromethane, dibromomethane, chloroform, tribromomethane, carbon tetrachloride, 1,1-dichloroethane, 1,2-dichloroethane, 1,1,1-trichloroethane, 1,1,2-trichloroethane, trichloroethylene, tetrachloroethylene (perchloroethylene), 1,2-dichloropropane, chlorobenzene, dichlorobenzene, trichlorobenzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethyl ketone, methylisobutylketone, pentanone, and hexanone; $C_{1-8}$ ethers such as bis(2-chloroethyl)ether; $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases may be purified from solutions or other liquid impurities. Examples of such gases include oxygen, carbon monoxide, carbon dioxide, sulfur dioxide, hydrogen sulfide, ammonia, and the like.

The hollow fiber membrane device of the invention is constructed using processes well known in the art. Generally, the hollow fiber membranes are bundled into a desirable shape, preferably the bundles are arranged in a series of concentric layers or bias wrap laying down of fibers. The tubesheets are formed about the ends of the bundle either simultaneously with laying down of the fibers, or after the bundles are formed by techniques well known in the art. The permeate flow channels are arranged within the hollow fiber bundle during fabrication of the bundle, wherein the permeate flow channels are preferably arranged at the interface between the adjacent membrane layers.

The hollow fiber bundle with tubesheets, with or without the core, is inserted into the shell, followed by attachment of endcaps at the first and second ends of the shell. The following descriptions of preferred embodiments as illustrated by the figures is provided to further illustrate the invention.

FIG. 1 illustrates a hollow fiber membrane device 1 of the invention wherein the entire device is housed within a shell 2. The device comprises a bundle of hollow fibers 3, comprising permeate flow channels 4 interspersed in the bundle. The permeate flow channels 4 comprise a series of hollow cylinders and are arranged in a parallel fashion to the core tube 5. The core tube 5 extends through the first tubesheet 6 and the second tubesheet 7 and is bonded thereto. In one embodiment, the hollow fiber bundle 3 is arranged around the core tube 5. Encircling the entire hollow fiber bundle 3 and tubesheets 6 and 7 is a case 2. A first endplate 8 is adapted for sealing the first end of the case 2 nearest the first tubesheet 6. A second endplate 9 is adapted for sealing the second end of the case 2 nearest the second tubesheet 7. The first endplate 8 comprises a feed inlet port 10 for introducing into the device a fluid mixture to be separated. The second endplate 9 comprises a non-permeate outlet port 11 to withdraw the retentate fluids from the device. A permeate outlet port 12 for withdrawing the permeate fluid from the device is located in the case 2 near the first tubesheet 6. The first tubesheet 6, first endplate 8, and case 2 form a feed inlet region 13, wherein the feed fluid mixture is introduced and which is adjacent to the face of the first tubesheet 6 to which the one end of the hollow fiber bundle 3 is open. A non-permeate outlet region 14 is defined by the outside face of the second tubesheet 7, the second endplate 9, and the case 2, and is the region where the non-permeating fluids exit the hollow fibers, and from which the non-permeating fluids are withdrawn through the non-permeate outlet port 11. The permeate fluid is removed via the permeate outlet port 12.

Figure 2:
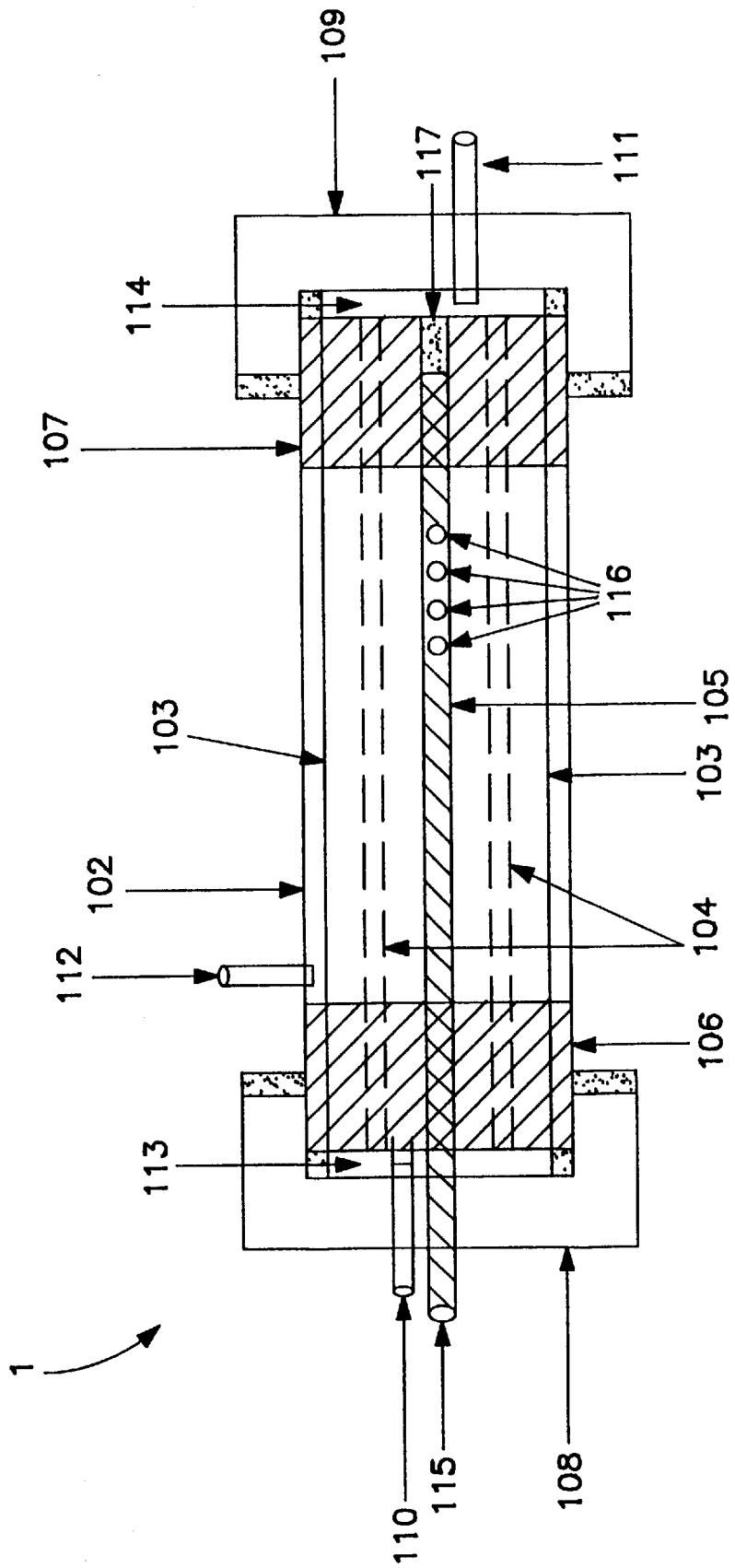
FIG. 2 illustrates a sectional view of the membrane separation device according to another embodiment of the invention for carrying separations utilizing sweep fluids.

FIG. 2 illustrates another embodiment of the invention device, wherein the hollow fiber membrane device 1 is adapted for the use of a sweep fluid. The entire device 1 is housed within a shell 102. The device comprises a bundle of hollow fibers 103, comprising permeate flow channels 104 interspersed in the bundle. The permeate flow channels 104 comprise a series of hollow cylinders and are arranged in a parallel fashion to the core tube 105. The core tube 105 extends through the first tubesheet 106 and the second tubesheet 107 and is bonded thereto. In one embodiment, the hollow fiber bundle 103 is arranged around the core tube 105. Encircling the entire hollow fiber bundle 103 and tubesheets 106 and 107 is a case 102. A first endplate 108 is adapted for sealing the first end of the case 102 nearest the first tubesheet 106. A second endplate 109 is adapted for sealing the second end of the case 102 nearest the second tubesheet 107. The first endplate 108 comprises a feed inlet port 110 for introducing into the device a fluid mixture to be separated. The second endplate 109 comprises a non-permeate outlet port 111 to withdraw the retentate fluids from the device. A permeate outlet port 112 for withdrawing the permeate fluid from the device is located in the case 102 near the first tubesheet 106. The first tubesheet 106, first endplate 108, and case 102 form a feed inlet region 113, wherein the feed fluid mixture is introduced and which is adjacent to the face of the first tubesheet 106 to which the one end of the hollow fiber bundle 103 is open. A non-permeate outlet region 114 is defined by the outside face of the second tubesheet 107, the second endplate 109, and the case 102, and is the region where the non-permeating fluids exit the hollow fibers, and from which the non-permeating fluids are withdrawn through the non-permeate outlet port 111. The permeate fluid is removed via the permeate outlet port 112. The core 105 at a first end has a sweep fluid inlet port 115 adapted for introducing a sweep fluid into the hollow fiber bundle 103 via perforations 116 in the core 105. The core 105 is plugged by a plug 117 at its second end, thereby forcing all the sweep fluid into the hollow fiber membrane bundle 103. The device further comprises a series of permeate flow channels 104 which are arranged within the bundle as described above.

FIG. 3 demonstrates a cross-sectional view of the membrane device shown in FIG. 1. A bundle of hollow fibers 203 arranged about a core or an axial void 205, with a series of permeate flow channels 204 is arranged in concentric fashion through the bundle.

Operation of the membrane device can be illustrated by reference to FIG. 1. A fluid mixture to be separated is introduced via the feed inlet port 10 into the feed inlet region 13 under pressure. The fluid mixture flows through the bores of the hollow fiber membranes, and a portion of the feed fluid mixture permeates across the membranes into the shellside region of the membrane device. The permeate flow channels 4 provide lower pressure resistance to flow and the permeate fluid to flow countercurrent to the feed fluid flow direction. The retentate fluid exits the hollow fibers of the bundle 3 into the permeate outlet region 14 and is removed from the device through the non-permeate outlet port 11. The permeate is removed from the shellside of the device through the permeate fluid outlet port 12.

Thus, a device comprising hollow fiber membranes with discrete flow channels incorporated in the membrane bundles is disclosed. Although preferred embodiments of the invention device have been described in some detail, it is understood that obvious variations can be made without departing from the spirit and scope of the invention as defined by the appended claims.

We claim:

1. A hollow fiber membrane fluid separation device adapted for boreside feed, said device comprising:
 (a) a plurality of elongate hollow fiber membranes adapted for separation of one or more fluids from a fluid mixture, wherein said membranes are arranged in a bundle having a first end and a second end;
 (b) a first tubesheet having an inner face and an outer face and arranged at the first end of the bundle, wherein said hollow fiber membranes extend through said first tubesheet and are open at the outer face thereof;
 (c) a second tubesheet having an inner face and an outer face and arranged at the second end of the bundle, wherein said hollow fiber membranes extend through said second tubesheet and are open at the outer face thereof;
 (d) a core about which the bundle of hollow fiber membranes is arranged, wherein said core extends through and is attached to said first and second tubesheets;
 (e) a plurality of elongate permeate flow channels arranged uniformly within the bundle and extending from the first end to the second end of the bundle, wherein said permeate flow channels are optionally embedded in said first and second tubesheets, and further wherein said permeate flow channels have a high void fraction and decreased resistance to fluid flow;
 (f) an elongate shell having first and second open ends, wherein the bundle, the first and second tubesheets, and the core are encased within said shell and the first tubesheet is arranged at the first end of said shell and the second tubesheet is arranged at the second end of said shell;
 (g) a first sealing endcap which is attached to the first open end of the shell, wherein a feed inlet region is established between said endcap and the outer face of the first tubesheet;
 (h) a feed inlet for introducing into the feed inlet region a fluid mixture to be separated into the bores of the hollow fiber membranes;
 (i) a second sealing endcap which is attached to the second open end of the shell, wherein a non-permeate outlet region is established between said second endcap and the outer face of the second tubesheet;
 (j) an outlet for removing from the non-permeate outlet region fluid from the mixture which does not permeate from the hollow fiber membranes;
 (k) first and second sealing means which respectively seal the first and second tubesheets against the shell, thereby defining a permeate outlet region between said shell and the outside of said bundle; and
 (l) a permeate outlet means for removing fluid which permeates from the hollow fiber membranes into the permeate outlet region.

2. The device of claim 1, wherein the permeate flow channels further extend through said first and second tubesheets and are sealed at the outer faces of said first and second tubesheets.

3. The device of claim 1, wherein the bundle is comprised of a series of concentric layers of hollow fiber membranes arranged about the core.

4. The device of claim 3, wherein the permeate flow channels are arranged at the interfaces between adjacent concentric membrane layers.

5. The device of claim 3, wherein the bundle further comprises a series of additional channels, wherein said additional channels are perpendicular to said bundle.

6. The device of claim 5, wherein a first set of said additional channels are located within 0–50% of the overall bundle length and are located with close proximity to the feed channel.

7. The device of claim 6, wherein the device further comprises a second set of said additional channels within 50–100% of the overall bundle length and are located in a region opposite to the feed channel.

8. The device of claim 5, wherein said additional channels are radially distributed.

9. The device of claim 8, wherein said additional channels terminate into the permeate outlet region.

10. The device of claim 5, wherein said additional channels are helically distributed, and further wherein said channels are between about 3 to about 115 times the diameter of the hollow membrane fiber.

11. The device of claim 1, wherein the permeate flow channels are arranged in the bundle as a series of concentric rings which encircle the core.

12. The device of claim 1, wherein hollow fiber packing density in the bundle is at least about 40 percent.

13. The device of claim 12, wherein the hollow fiber packing density is at least about 50 percent.

14. The device of claim 1, wherein the fluid mixture to be separated comprises a mixture of two or more gases.

15. The device of claim 14, wherein said mixture of gases comprises a gas selected from the group consisting of hydrogen, oxygen, helium, nitrogen, methane, carbon monoxide, and carbon dioxide.

16. The device of claim 1 further comprising a sweep inlet means for introducing a sweep fluid into the permeate outlet region.

17. The device of claim 16 wherein the sweep inlet means is located at the opposite end of the module from the gas feed port.

18. The device of claim 16 wherein the sweep inlet means is located at the same end of the module as the gas feed port.

19. A hollow fiber membrane fluid separation device adapted for boreside feed, said device comprising:

(a) a plurality of elongate hollow fiber membranes adapted for separation of one or more fluids from a fluid mixture, wherein said membranes are arranged in a bundle in series of concentric layers of hollow membranes arranged about the core, said bundle having a first end and a second end, wherein the hollow fiber packing density in the bundle is at least about 40%;

(b) a first tubesheet having an inner face and an outer face and arranged at the first end of the bundle, wherein said hollow fiber membranes extend through said first tubesheet and are open at the outer face thereof;

(c) a second tubesheet having an inner face and an outer face and arranged at the second end of the bundle, wherein said hollow fiber membranes extend through said second tubesheet and are open at the outer face thereof;

(d) a core about which the bundle of hollow fiber membranes is arranged, wherein said core extends through and is attached to said first and second tubesheets;

(e) a plurality of elongate permeate flow channels arranged uniformly in the bundle as a series of concentric rings which encircle the core, and extending from the first end to the second end of the bundle, wherein said flow channels further extend through said first and second tubesheets and are sealed at the outer faces of said first and second tubesheets, and further wherein said permeate flow channels have a high void fraction and decreased resistance to fluid flow;

(f) an elongate shell having first and second open ends, wherein the bundle, the first and second tubesheets, and the core are encased within said shell and the first tubesheet is arranged at the first end of said shell and the second tubesheet is arranged at the second end of said shell;

(g) a first sealing endcap which is attached to the first open end of the shell, wherein a feed inlet region is established between said endcap and the outer face of the first tubesheet;

(h) a feed inlet for introducing into the feed inlet region a fluid mixture to be separated into the bores of the hollow fiber membranes;

(i) a second sealing endcap which is attached to the second open end of the shell, wherein a non-permeate outlet region is established between said second endcap and the outer face of the second tubesheet;

(j) an outlet for removing from the non-permeate outlet region fluid from the mixture which does not permeate from the hollow fiber membranes;

(k) first and second sealing means which respectively seal the first and second tubesheets against the shell, thereby defining a permeate outlet region between said shell and the outside of said bundle;

(l) a permeate outlet means for removing fluid which permeates from the hollow fiber membranes into the permeate outlet region; and (m) a sweep inlet means for introducing a sweep fluid into the permeate outlet region.

20. A hollow fiber membrane fluid separation device adapted for boreside feed, said device comprising:

(a) a plurality of elongate hollow fiber membranes adapted for separation of one or more fluids from a fluid mixture, wherein said membranes are arranged in a bundle having a first end and a second end;

(b) a first tubesheet having an inner face and an outer face and arranged at the first end of the bundle, wherein said hollow fiber membranes extend through said first tubesheet and are open at the outer face thereof;

(c) a second tubesheet having an inner face and an outer face and arranged at the second end of the bundle, wherein said hollow fiber membranes extend through said second tubesheet and are open at the outer face thereof;

(d) a plurality of elongate permeate flow channels arranged uniformly within the bundle and extending from the first end to the second end of the bundle, wherein said flow channels further extend through said first and second tubesheets and are sealed at the outer faces of said first and second tubesheets and further wherein said permeate flow channels have a high void fraction and decreased resistance to fluid flow;

(e) an elongate shell having first and second open ends, wherein the bundle and first and second tubesheets are encased within said shell and the first tubesheet is arranged at the first end of said shell and the second tubesheet is arranged at the second end of said shell;

(f) a first sealing endcap which is attached to the first open end of the shell, wherein a feed inlet region is established between said endcap and the outer face of the first tubesheet;

(g) a feed inlet for introducing into the feed inlet region a fluid mixture to be separated into the bores of the hollow fiber membranes;

(h) a second sealing endcap which is attached to the second open end of the shell, wherein a non-permeate outlet region is established between said second endcap and the outer face of the second tubesheet;

(i) an outlet for removing from the non-permeate outlet region fluid from the mixture which does not permeate from the hollow fiber membranes;

(j) first and second sealing means which respectively seal the first and second tubesheets against the shell, thereby defining a permeate outlet region between said shell and the outside of said bundle; and (k) a permeate outlet means for removing fluid which permeates from the hollow fiber membranes into the permeate outlet region.

21. The device of claim 20 comprising a plurality of bundles, each bundle comprising first and second tubesheets, encased within said shell.

* * * * *

UNITED STATES PATENT AND TRADEMARK OFFICE

CERTIFICATE OF CORRECTION

PATENT NO. : 6,136,073

DATED : October 24, 2000

INVENTOR(S) : Coan et al.

It is certified that error appears in the above-identified patent and that said Letters Patent is hereby corrected as shown below:

ON THE TITLE PAGE

Under "Attorney, Agent, or Firm" please replace "Robbins & Associates" with --Robins & Associates--

Signed and Sealed this

Eighth Day of May, 2001

*Attest:*

NICHOLAS P. GODICI

*Attesting Officer*      *Acting Director of the United States Patent and Trademark Office*